(12) United States Patent
Sheffield et al.

(10) Patent No.: US 7,366,767 B2
(45) Date of Patent: Apr. 29, 2008

(54) DICTATION SYSTEM EMPLOYING COMPUTER-TO-COMPUTER TRANSMISSION OF VOICE FILES CONTROLLED BY HAND MICROPHONE

(75) Inventors: John Sheffield, Milford, CT (US);
Betsy L. Hipp, Orange, CT (US);
Vincent F. Antezzo, Stratford, CT (US);
Frederic Schneider, Orange, CT (US);
Donald Martin, New Milford, CT (US); Roger A. Dumschott, Watertown, CT (US)

(73) Assignee: Dictaphone Corporation, Stratford, CT (US)

( * ) Notice: Subject to any disclaimer, the term of this patent is extended or adjusted under 35 U.S.C. 154(b) by 97 days.

(21) Appl. No.: 10/752,036

(22) Filed: Jan. 7, 2004

(65) Prior Publication Data

US 2004/0260779 A1      Dec. 23, 2004

Related U.S. Application Data

(62) Division of application No. 09/099,501, filed on Jun. 18, 1998, now Pat. No. 6,697,841.

(60) Provisional application No. 60/050,635, filed on Jun. 24, 1997.

(51) Int. Cl.
*G06F 15/16* (2006.01)
*G06F 17/00* (2006.01)

(52) U.S. Cl. ............... 709/217; 709/206; 379/61.7; 379/88.01

(58) Field of Classification Search ............ 700/65–66; 345/156–184; 455/556–557; 379/368, 58, 379/93.24, 88.13, 265.09, 433.03, 61.7, 88.01, 379/256.09; 710/73; 340/426.15; 348/14.05; 369/24.01, 25.01; 709/203, 217, 218, 206
See application file for complete search history.

(56) References Cited

U.S. PATENT DOCUMENTS

| 4,523,055 | A |   | 6/1985  | Hohl et al. |
| 4,969,180 | A |   | 11/1990 | Watterson et al. |
| 4,975,896 | A | * | 12/1990 | D'Agosto et al. ....... 369/29.01 |
| 5,197,052 | A |   | 3/1993  | Schroder et al. |
| 5,261,042 | A | * | 11/1993 | Brandt ...................... 715/841 |
| 5,402,518 | A | * | 3/1995  | Lowery ..................... 704/201 |
| 5,557,659 | A | * | 9/1996  | Hyde-Thomson ........ 379/88.13 |
| 5,568,536 | A | * | 10/1996 | Tiller et al. ................ 455/557 |

(Continued)

OTHER PUBLICATIONS

Handbook: Learn Netscape, Netscape Communication Corp., 1996.

*Primary Examiner*—Zarni Maung
(74) *Attorney, Agent, or Firm*—Kelley Drye & Warren LLP

(57) ABSTRACT

A dictation system is formed of two personal computers connected by an e-mail system. A hand microphone with control switches is provided at one personal computer and a foot pedal is provided at the other personal computer. The hand microphone is used to generate a dictation file at the first personal computer. In response to actuation of a control switch on the hand microphone, the dictation file is transmitted via the electronic mail system to the second personal computer. The foot pedal at the second personal computer is used to control audible reproduction of the dictation file for the purpose of transcription at the second personal computer. The resulting text file is sent via the electronic mail system from the second personal computer to the first personal computer.

5 Claims, 11 Drawing Sheets

U.S. PATENT DOCUMENTS

| | | | |
|---|---|---|---|
| 5,689,550 A * | 11/1997 | Garson et al. ........... 379/88.18 |
| 5,721,827 A | 2/1998 | Logan et al. |
| 5,732,216 A | 3/1998 | Logan et al. |
| 5,771,355 A * | 6/1998 | Kuzma ....................... 709/232 |
| 5,812,977 A | 9/1998 | Douglas |
| 5,819,175 A * | 10/1998 | Niemi ........................ 455/418 |
| 5,838,313 A | 11/1998 | Hou et al. |
| 5,857,099 A | 1/1999 | Mitchell et al. |
| 5,875,448 A | 2/1999 | Boys et al. |
| 6,023,779 A | 2/2000 | Fullam et al. |
| 6,049,796 A | 4/2000 | Siitonen et al. |
| 6,069,614 A * | 5/2000 | Singhal ....................... 345/158 |
| 6,138,036 A | 10/2000 | O'Cinneide |
| 6,169,911 B1 | 1/2001 | Wagner et al. |
| 6,199,076 B1 * | 3/2001 | Logan et al. ............. 715/501.1 |
| 6,222,909 B1 | 4/2001 | Qua et al. |
| 6,526,129 B1 * | 2/2003 | Beaton et al. ........... 379/90.01 |
| 6,560,707 B2 * | 5/2003 | Curtis et al. ................ 713/163 |
| 6,697,841 B1 * | 2/2004 | Sheffield et al. ............ 709/206 |
| 2004/0071302 A1 * | 4/2004 | Niehoff ....................... 381/172 |

\* cited by examiner

HAND MIC.
ELECTRONICS

DICTATION SYSTEM EMPLOYING COMPUTER-TO-COMPUTER TRANSMISSION OF VOICE FILES CONTROLLED BY HAND MICROPHONE

CROSS-REFERENCE TO RELATED APPLICATION

This is a continuation-in-part of co-pending provisional patent application Ser. No. 60/050,635, filed Jun. 24, 1997.

This application is a divisional of U.S. patent application Ser. No. 09/099,501, filed Jun. 18, 1998 now U.S. Pat. No. 6,697,841.

FIELD OF THE INVENTION

This invention is concerned with dictation systems.

BACKGROUND OF THE INVENTION

Known dictation systems come in a variety of forms.

According to one long-standing practice, the author of an item of dictation uses a desktop or portable recorder to record an analog audio signal on a portable recording medium, typically a magnetic tape cassette. The portable recording medium is then transported to the transcriptionist's desk, where a desktop transcription device is employed to audibly reproduce the analog signal from the recording medium.

Also known are central dictation systems, which eliminate the need to transport the recording medium from the author's working quarters to the transcriptionist's location. In a typical central dictation system, a dictation terminal located in the author's workspace is connected by a dial-up or hard-wired signal path to a main recorder. For many years, the common practice was to implement the recorder as either an endless loop tape recorder (of the type marketed by the assignee of this application under the trademark "Thought Tank") or as a cassette changer. More recently, digital recording on a hard disk has become the state of the art for central dictation recorders. In any case, the recorded voice signal which constitutes the dictated material is reproduced so as to be audible at the transcriptionist's workstation for transcription into a text file.

Central dictation systems can be highly efficient and very convenient for the authors of the dictation, and are often used in dictation-intensive environments such as medical records departments in hospitals. However, for small work groups or for, installations having relatively small volumes of dictation, it may not attractive to make the investment in dedicated equipment which is required for a central dictation system.

It would be desirable to provide a low-cost dictation system that provides flexibility and a high degree of convenience for the author.

OBJECTS AND SUMMARY OF THE INVENTION

It is an object of the invention to provide a dictation system having a highly convenient user interface.

It is a further object of the invention to provide a dictation system which does not require physical transportation of a recording medium.

It is still a further object of the invention to provide a dictation system which requires a minimal investment in equipment.

According to an aspect of the invention, there is provided a method of operating a dictation system, the system including a first personal computer, a hand microphone having a plurality of control switches and connected to the first personal computer for inputting voice information for storage in the first personal computer, a second personal computer, an electronic mail system for transmitting electronic mail messages between the first and second personal computers, and equipment associated with the second personal computer for audibly playing voice information stored in the second personal computer, the method including the steps of using the hand microphone to generate a voice information file in the first personal computer, actuating one of the control switches of the hand microphone and responding to actuation of the one of the control switches by transmitting the voice information file from the first personal computer to the second personal computer by means of the electronic mail system, and storing the transmitted voice information file in the second personal computer.

At the second personal computer, the voice information is audibly reproduced, and is transcribed by a transcriptionist to create a text file, preferably in the second personal computer itself. The resulting text file may be transmitted via the electronic mail system from the second personal computer to the first personal computer.

According to another aspect of the invention, there is provided a dictation system including a first personal computer, a hand microphone connected to the first personal computer and including a plurality of control switches, and a second personal computer connected to the first personal computer by an electronic mail system, the first personal computer including a memory device for storing a voice information file representative of voice signals generated by the hand microphone, the first personal computer also including a mechanism for responding to actuation of one of the control switches of the hand microphone by transmitting the voice information file to the second personal computer via the electronic mail system, the second personal computer having associated therewith a device for audibly reproducing the voice information file transmitted to the second personal computer from the first personal computer.

A dictation system provided in accordance with the invention provides highly convenient, flexible and efficient dictation capabilities while making use of an installed base of information technology equipment. A preferred embodiment of the invention rivals conventional central dictation systems in terms of user-friendliness, while requiring only a small fraction of the incremental capital investment required for a central dictation system.

Other objects, features and advantages of the invention will become apparent from the subsequent more detailed description of preferred embodiments.

DESCRIPTION OF PREFERRED EMBODIMENTS

Figure 1:
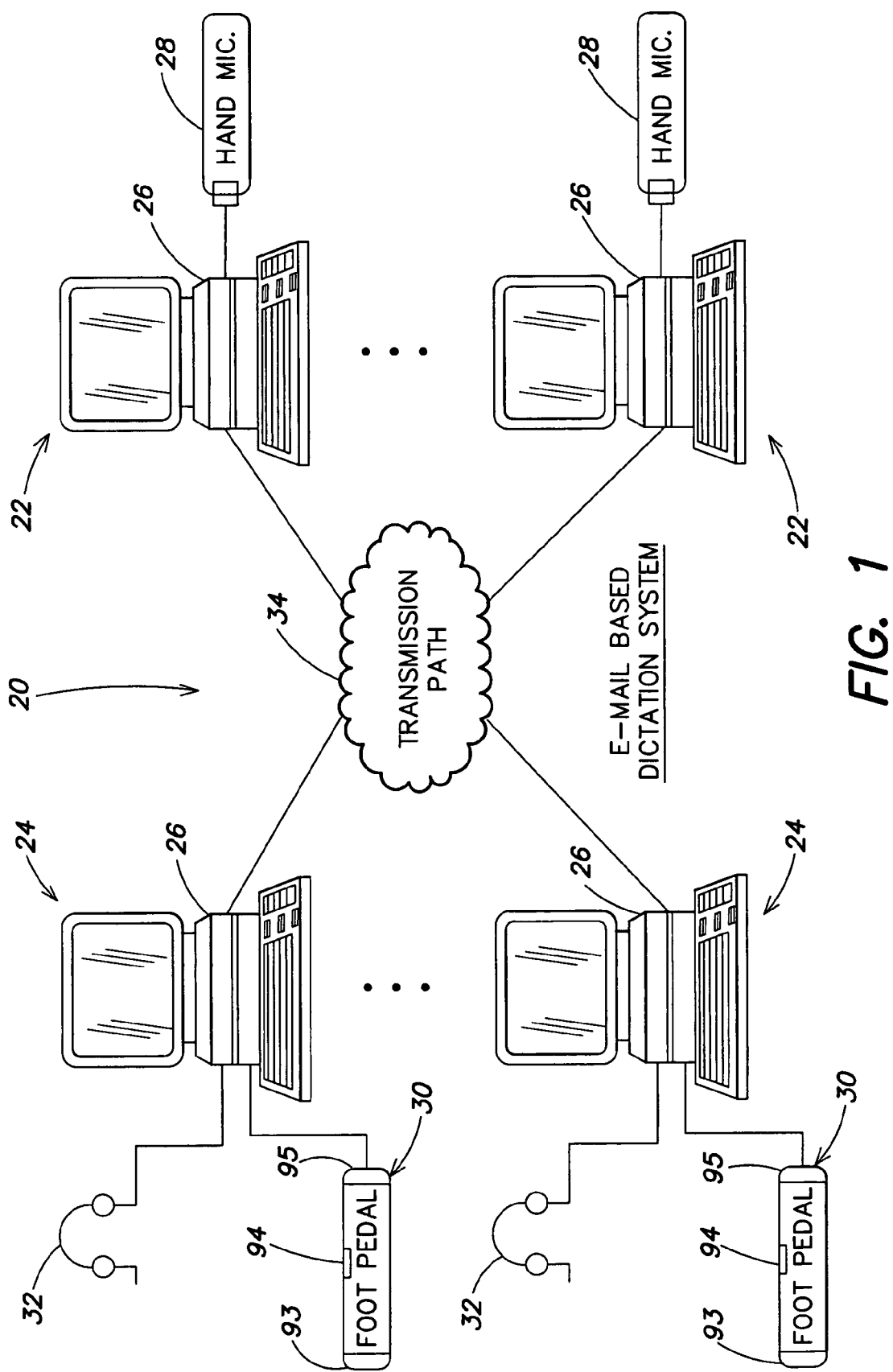
FIG. 1 is a schematic illustration of a dictation system provided in accordance with the invention.

A preferred embodiment of the invention will now be described, initially with reference to FIG. 1. In FIG. 1, reference numeral 20 generally indicates a dictation system formed of a network of personal computers, connected by an electronic mail system. The system 20 includes a plurality of author workstations indicated at 22 and a plurality of transcriptionist workstations indicated at 24. Each of the workstations 22 or 24 is shown as including a personal computer (PC) 26. (For the purposes of this disclosure and the appended claims, the term "personal computer" should be understood to include computer devices providing capabilities like those of PC's, including servers, client terminals, so-called network computers, and so forth.) As is conventional, the PC's include components such as a display, a keyboard, a mouse, a central processing unit, program and working memory, and a mass storage device such as a hard disk drive.

Each of the author workstations 22 is shown to include a hand microphone 28 connected to the respective PC 26. In each of the transcriptionists' workstations 24, a foot pedal 30 and a headset 32 are connected to the respective PC 26. Preferably all of the hand microphones 28, foot pedals 30 and headsets 32 are conventional items such as are used with dictation systems. For example, the hand microphone 28 may be an item available from the assignee of the present application under the designation Part Number 878985. The hand microphone may include a bar code reader (not shown) to provide rapid input of bar-coded file information. The foot pedals may be of the type available from the assignee of this application as Part No. 148519, and the headset may be the item designated by the assignee of this application as Part No. 501054.

In a preferred embodiment of the invention, part of the connection between the hand microphone 28 and the computer 26 is provided by an interface module (not separately shown) designated by the assignee of this application as Part No. 148510. The hand microphone 28 may be of the type which outputs an analog voice signal, in which case digitization of the voice signal takes place in an interface module or in a conventional sound card provided in the computer 26. As an alternative, the hand microphone 28 may be of a type which outputs a digitized voice signal.

As indicated at 34 in FIG. 1, suitable cabling and/or other equipment provides a path for transmission of data signals among the computers 26. The schematically-indicated transmission path 34 is preferably managed by conventional electronic mail software, such as the well-known Microsoft Exchange software, to provide known electronic mail messaging functions.

Certain details of the hand microphones 28 will now be described with reference with FIGS. 2 and 3.

Figure 2:
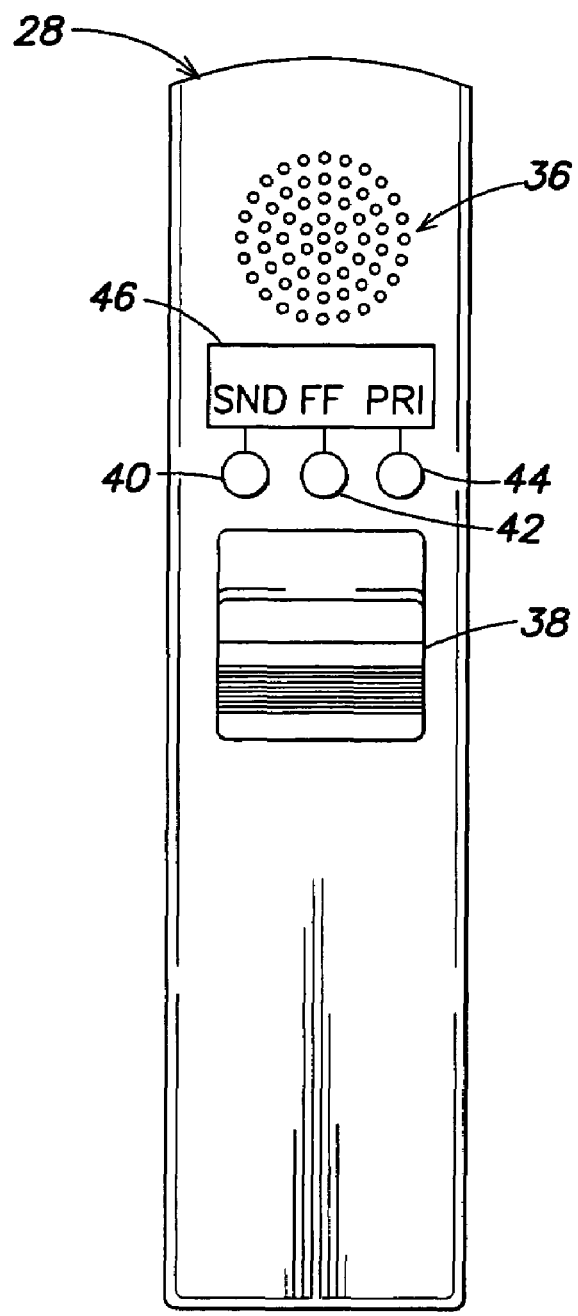
FIG. 2 is a front elevational view of a hand microphone used in the dictation system of FIG. 1.

FIG. 2 illustrates certain aspects of the user interface provided by the hand microphone 28. Shown in FIG. 2 is a front elevation of the hand microphone 28, including a grille region 36 behind which are provided a microphone and a speaker (which are not shown in FIG. 2). A multi-position slide switch 38 is installed at a central portion of the front elevation of the hand microphone 28. The slide switch 38 is preferably like those featured as part of the user interface in high-quality dictation equipment. Each of the positions of the slide switch 38 corresponds to a respective dictation function such as "record", "play", "rewind", "stop", or "record lock".

Above the-slide switch 38 is a row of push button switches 40, 42, 44. According to a preferred embodiment of the invention, one or more of the switches 40, 42, 44 may be "soft" or programmable, in the sense that the function actuated by the respective switch can be changed by inputting suitable programming signals to the respective PC 26. If the switches 40, 42, 44 are programmable, it is preferred that a display 46 be mounted on the microphone 28 above the programmable switches, to present characters indicative of the currently programmed functions of the switches.

Figure 3:
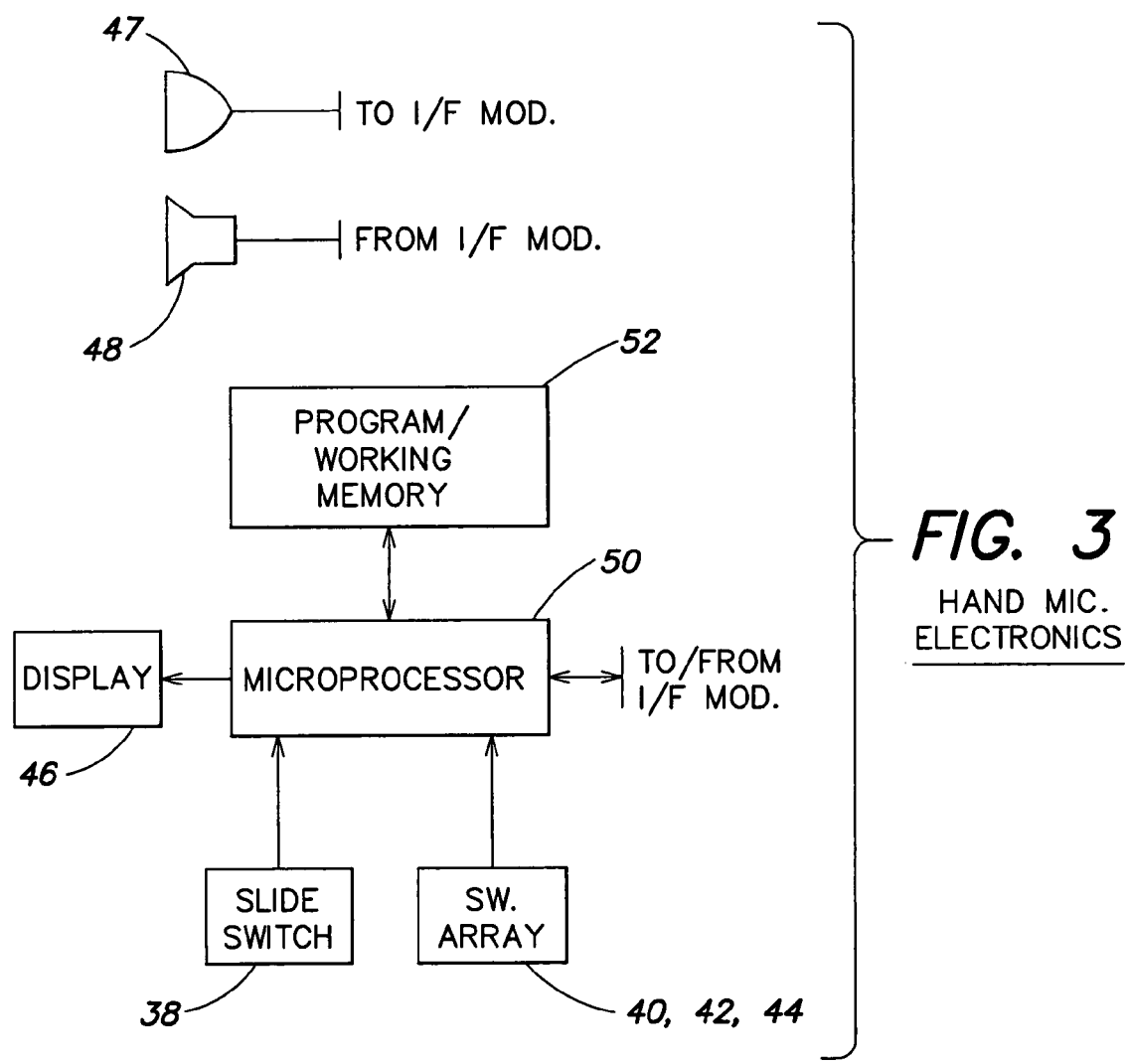
FIG. 3 is a block-diagram illustration of electronic components of the hand microphone of FIG. 2.

Electrical and electronic components of the hand microphone 28 are schematically illustrated in FIG. 3. The electronic components include a microphone 46 connected to provide analog voice signals to the PC 26 via an interface module (not shown), and a speaker 48 for audibly reproducing voice signals received from the PC 26 via the interface module. The hand microphone includes a control circuit such as a microprocessor 50 which manages the user interface provided by the hand microphone. Associated with the microprocessor 50 are conventional components such as program/working memory 52. Microprocessor 50 exchanges digital command and status signals with the PC 26 by way of the interface module. User input signals are provided to the microprocessor 50 via the above-mentioned slide switch 38 and programmable switches 40, 42, 44. The display 46 is driven by the microprocessor 50.

Figure 4:
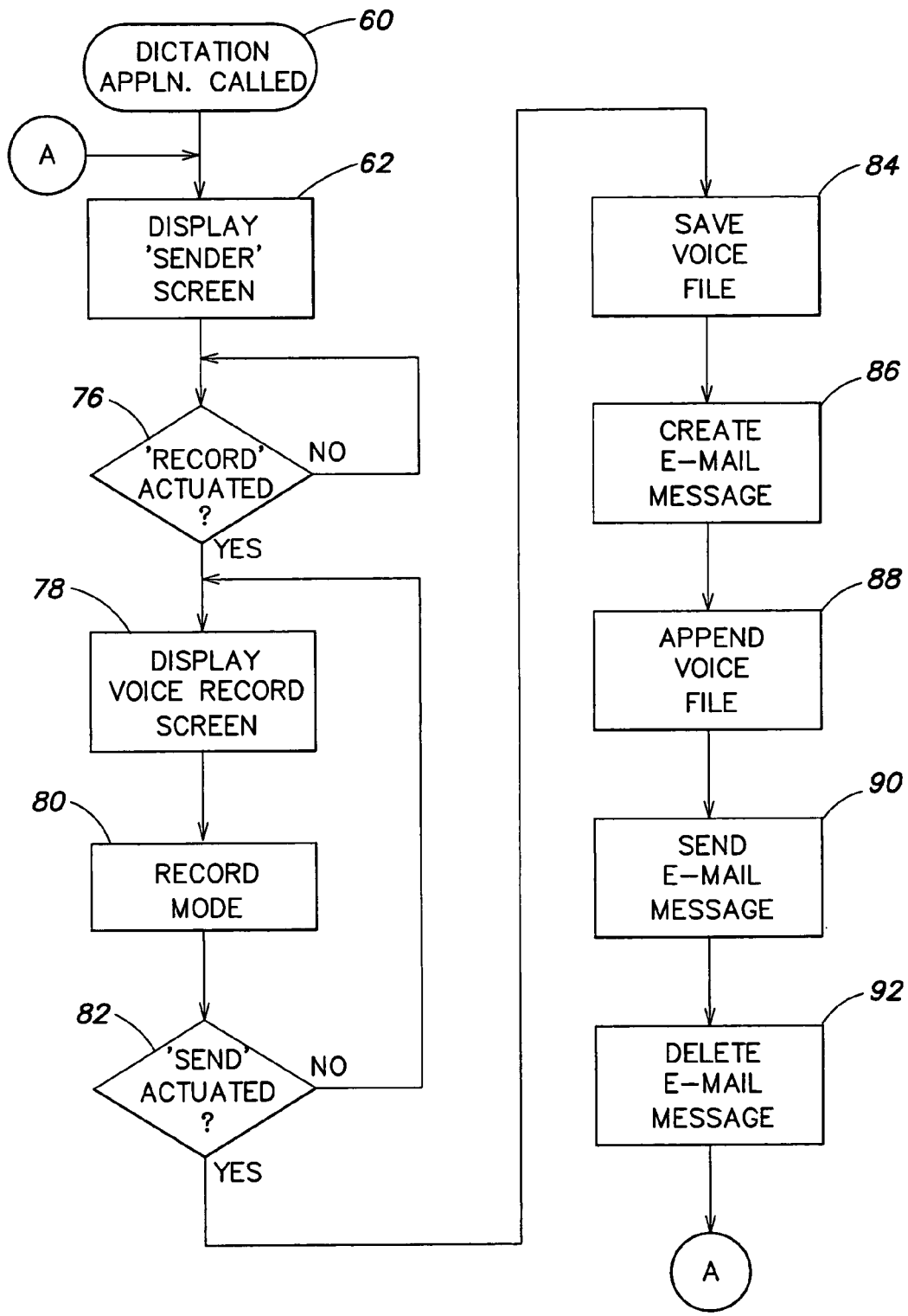
FIG. 4 is a flow chart which illustrates creation and transmittal of a dictation file according to an aspect of the invention.
Figure 5:
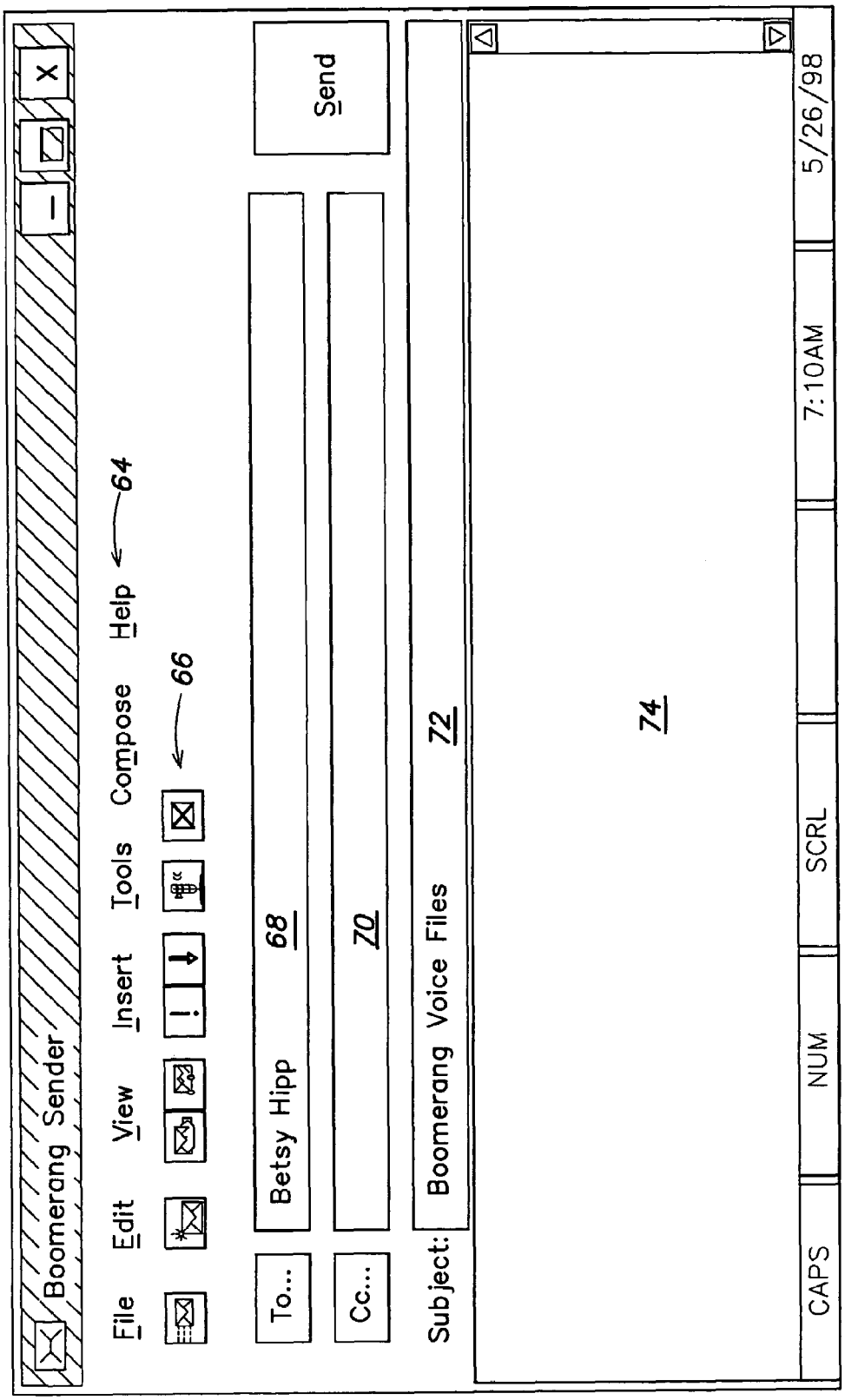
FIG. 5 is a screen display provided by a personal computer included in the system of FIG. 1 when the dictation function of the system is accessed.

FIG. 4 illustrates a software routine that is carried out at the PC 26 of an author workstation 22 when the workstation is used for the purpose of dictation in accordance with the invention. Initially, as indicated at block 60, the PC 26 at the author workstation 22 is operated to invoke a dictation software application resident on the PC 26. For example, the dictation application may be represented by an icon displayed according to conventional practice by the PC 26, and the icon may be actuated by means of a mouse-controlled cursor to open the dictation application. In response to the opening of the dictation application, the PC provides a screen display (step 62). An example of a suitable screen display is shown in FIG. 5. The screen display of FIG. 5 is similar to those provided in conventional e-mail systems operating with known graphical user interfaces such as that provided by the ubiquitous Windows 95 operating system. Among the features of the display of FIG. 5 are pull-down menus represented by headings shown at 64 and a toolbar indicated at 66. Both the pull-down menus and the toolbar are similar to those provided in conventional e-mail systems, but include additional features adapted for operation in the dictation application of the present invention.

The display of FIG. 5 also includes an addressee field 68. According to a preferred embodiment of the invention, the addressee field is populated with default addressee data which represents the designated transcriptionist for the author using the respective author workstation. Also included are conventional "Cc", subject and message fields respectively indicated at 70, 72 and 74. Typically, the Cc field is not needed or used in connection with transmission of dictation files. The subject and message fields may be employed by the author to provide context information (such as a client or file reference) and/or special instructions for the transcriptionist.

While providing the screen display of FIG. 5, the PC 26 at the author workstation is available for operation in a manner such that it emulates an item of dictation equipment. Dictation can be initiated simply by operating the hand microphone slide switch to place the slide switch in the position corresponding to the "record" function. Such an operation is indicated at step 76 in. FIG. 4. When this occurs, a suitable screen display (FIG. 6) replaces the messaging screen of FIG. 5, as indicated at step 78 in FIG. 4, and the PC enters into a recording mode (step 80). It is to be understood that the PC records voice signals generated by the hand microphone and provides the functions called for by operation of the slide switch in substantially the same manner as a conventional digital central dictation system, except that, in the present case, the recording medium (the PC's hard disk) is co-located with the author.

The voice signals generated at the hand microphone are stored in the PC as a dictation file, and the author may review and edit the dictation file. When the author wishes to review the dictation file, the rewind and play functions are sequentially activated by means of the hand microphone slide switch 38 and voice data from the dictation file is played back by the computer 26 via the speaker in the hand microphone.

When the author has completed the desired dictation, he or she may signify completion of the dictation file and automatically actuate transmission of the file to the transcriptionist all in a simple one-button operation, represented by step 82 in FIG. 4. According to a preferred embodiment of the invention, one of the programmable push button switches on the hand microphone 28 (FIG. 2) is programmed to actuate the send function. In the particular embodiment illustrated in FIG. 2, the left-most programmable button 40 is the "send" button. Once the "send" button has been pressed, the dictation task is completed from the author's point of view, and the dictation file is automatically dispatched to the transcriptionist without further action by the author.

Steps 84-92 in FIG. 4 indicate how the PC 26 implements transmission of the dictation file. Specifically, step 84 indicates that the voice data file created by the author is saved. Then, at step 86, the PC generates an e-mail message addressed to the transcriptionist identified initially at the addressee field 68 of the screen display of FIG. 5. Continuing to refer to FIG. 4, at step 88 the PC appends the saved voice file to the e-mail message created at step 86. Then, at step 90, the PC at the author's workstation sends the e-mail message, with the appended voice file, to the PC at the workstation 24 of the addressee transcriptionist.

It is to be understood that the activities at steps 86-90 may all be carried out in accordance with conventional functions of electronic mail systems. The e-mail message with the appended voice file is sent from the PC 26 at the author's workstation via the transmission path 34 (FIG. 1) to the PC 26 at the transcriptionist's workstation. Consequently, the single button press which indicates completion of the dictation task also fulfills the function of making the dictation available to the transcriptionist, without any further effort on the author's part. Also, the entire dictation task, including delivery of the voice file to the transcriptionist, can be accomplished by using the hand microphone alone. There is no need for the author to shift his or her hand to either the PC mouse or to the keyboard.

Referring again to FIG. 4, it is noted that step 92 follows step 90. At step 92, the author's PC deletes the transmitted e-mail message and the appended voice file. The routine of FIG. 4 then loops back to step 62 so that the messaging screen of FIG. 5 is again displayed, and the PC is ready to accept the start of another dictation task. As an alternative to the deletion of the e-mail message and associated dictation file indicated by step 92, it is contemplated to allow the author to save dictation files on the author's PC under author-selected file designations.

Additional functions and features provided by the dictation application of the present invention will now be described. Referring once more to FIG. 5, it is to be understood that the addressee field 68, although preferably populated with a default addressee corresponding to the author's customary transcriptionist, may be changed by the author to name an alternative transcriptionist. Also, as indicated before, the fields 70, 72 and 74 may be populated with information as desired by the author.

Functions available through the pull-down menus indicated at 64 in FIG. 5 will now be discussed. As seen from FIG. 5, the respective pull-down menus are represented by the following headings "File", "Edit", "View", "Insert", "Tools", "Compose", "Help".

The "File" pull-down menu presents the following options: "New", "Send" and "Exit". The "New" option initiates creation of a new voice message. The message header data fields within the message window of FIG. 5 are cleared and re-populated with the default values specified within the author's profile configuration.

The "Send" option saves and transmits the voice message currently being recorded, thereby accomplishing the same result as actuating the "Send" button on the hand microphone.

The "Exit" option shuts down the dictation application. If the author is still in the process of creating a dictation file, the PC displays a dialog box asking the author if the dictation file should be sent or discarded.

The "Edit" pull-down menu provides for conventional text editing functions to be applied to text displayed in the text fields of the screen display of FIG. 5.

The "View" pull-down menu permits the author to make changes in the format of the screen display of FIG. 5. For example, the toolbar, the "Cc" field and the text field may be either displayed or hidden, at the author's option.

The "Tools" pull-down menu presents the following options: "Delivery Receipt", "Read Receipt", "Priority", "Audio Properties" and "Options".

The "Delivery Receipt" option permits the author to select whether or not the system will provide confirmation that the dictation file has been delivered to the transcriptionist.

The "Read Receipt" option permits the author to determine whether or not the system will provide confirmation that the dictation file has been "read", i.e. opened by the transcriptionist.

The "Priority" option allows the user to designate the dictation file as having either a "low", "normal", or "high" priority. The default priority setting is "normal".

The "Audio Properties" option causes the PC to display a dialog box with three tabs labelled "Audio", "Handmic" and "Foot Control". The three corresponding pages for these dialog boxes are shown in FIGS. 7, 8 and 9 respectively.

Figure 7:
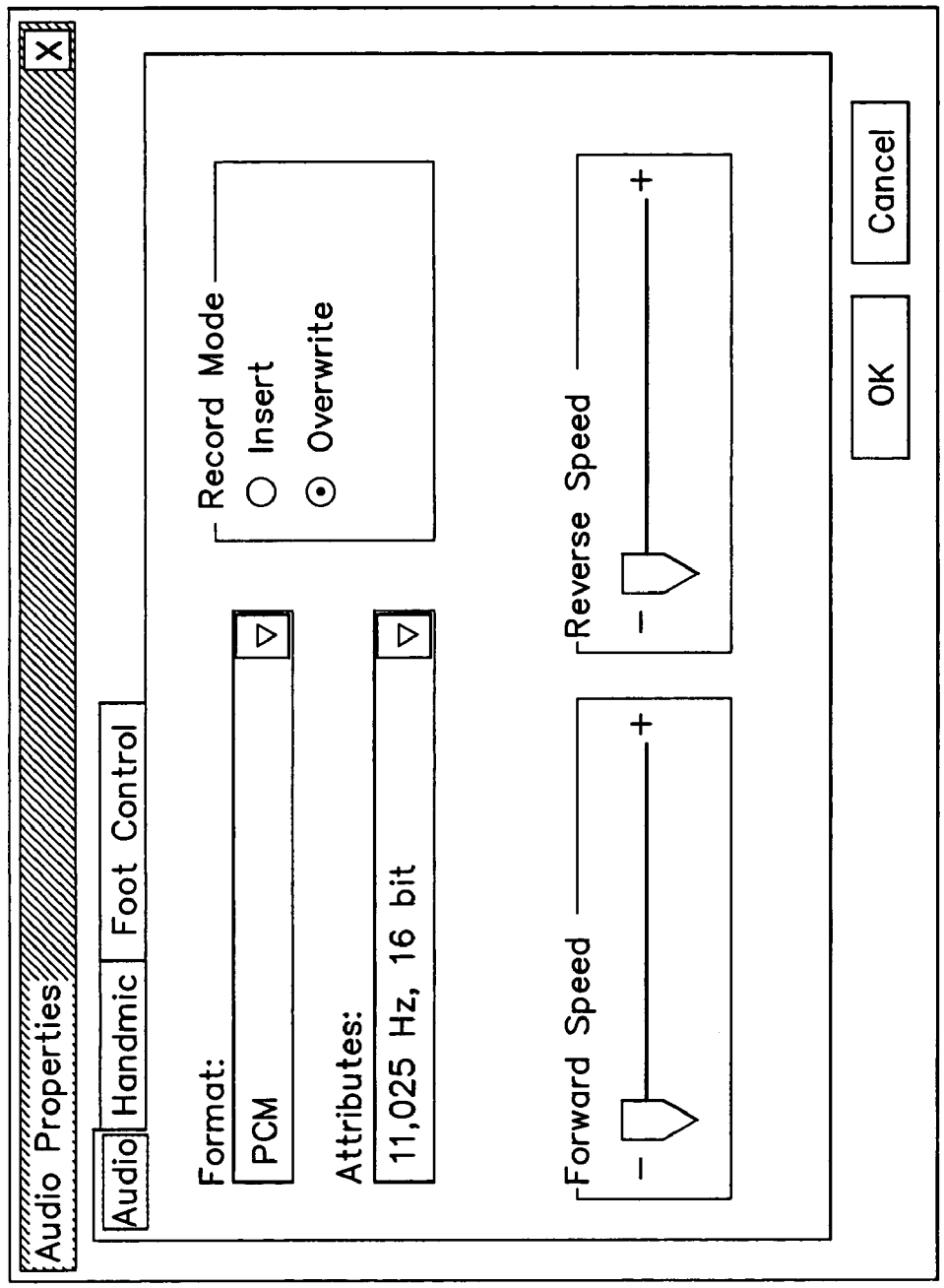
FIGS. 7-12 are screen displays provided to present options for, or information concerning, configuration of the dictation system.

Considering the "Audio" page shown in FIG. 7, it will be noted that slide bars are provided to permit the author to select the fast-forward and rewind speeds. In addition, the author is permitted to select among a plurality of audio data formats and compression rates. The author is also allowed to choose between "insert" and "overwrite" editing functions.

Figure 8:
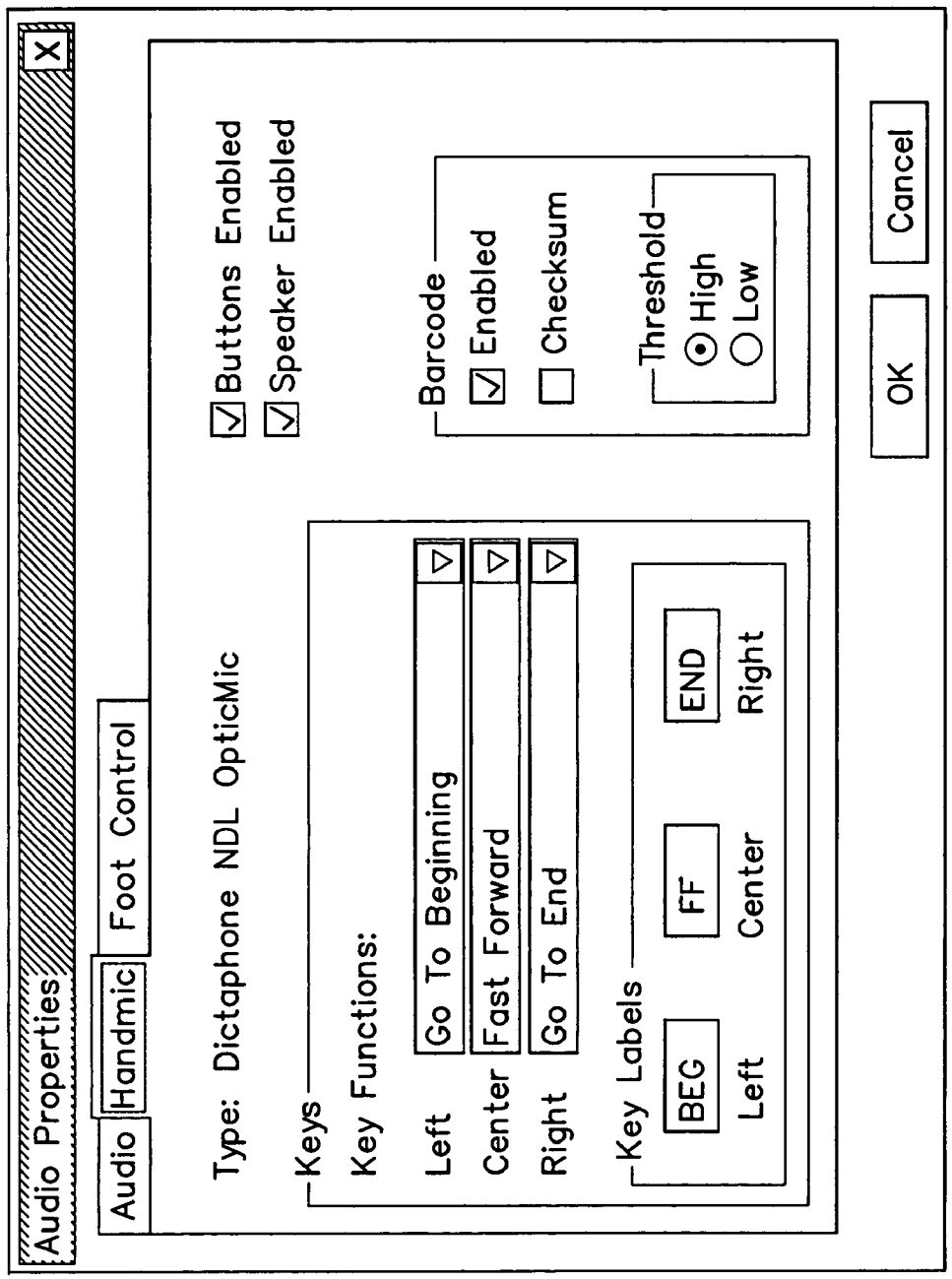
Figure 9:
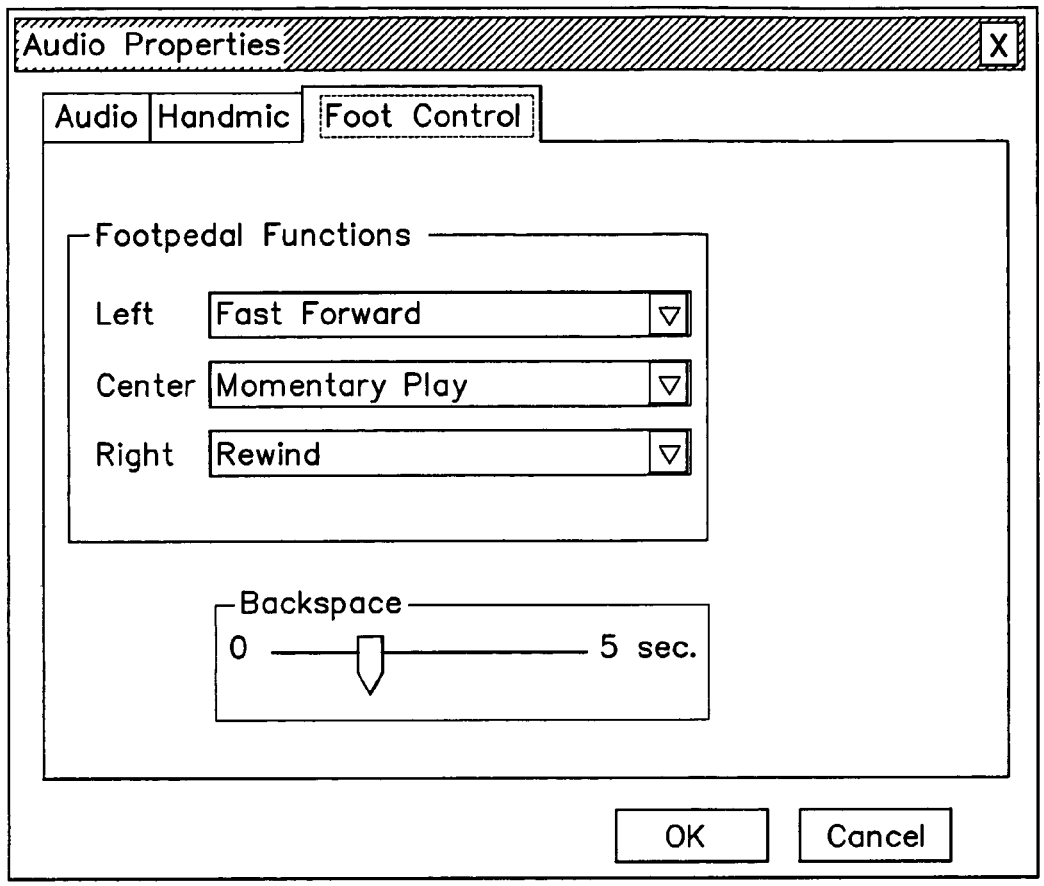

In the "Handmic" page shown in FIG. 8, the author is permitted to configure a number of aspects of the hand microphone. For example, the programmable buttons on the hand microphone may be enabled or disabled, the playback speaker component of the hand microphone may be enabled or disabled, and the integrated barcode reader (if present) may be enabled or disabled. Also, a checksum function for the barcode reader may be enabled or disabled. Moreover, the author is permitted to select between high and low thresholds for activating the microphone.

In addition, the author is allowed to program the functions of the programmable buttons 40, 42, 44 of the hand microphone 28 (FIG. 2). Continuing to refer to FIG. 8, in a preferred embodiment of the invention, each of the three buttons may be assigned any one of the following functions: send message, fast-forward, go to beginning of dictation file, go to end of dictation file, assert high priority. The author is also allowed to assign two- or three-letter button-identifying codes to be displayed by the display 46 (FIG. 2).

In the "Foot Control" display of FIG. 9, the user is permitted to program functions of the foot pedal 30 shown in FIG. 1. (It is to be understood that the options available in the display of FIG. 9 are primarily applicable to the transcriptionist's station 24.

It is assumed that the foot pedal has left, center and right foot-actuatable switches (indicated, respectively, at 93, 94, 95 in FIG. 1), which may be programmed to perform any one of the following functions: rewind, fast-forward, momentary play, continuous play, and stop. A slidebar is provided in FIG. 9 to allow setting of the time increment to be applied by the rewind function.

Figure 10:
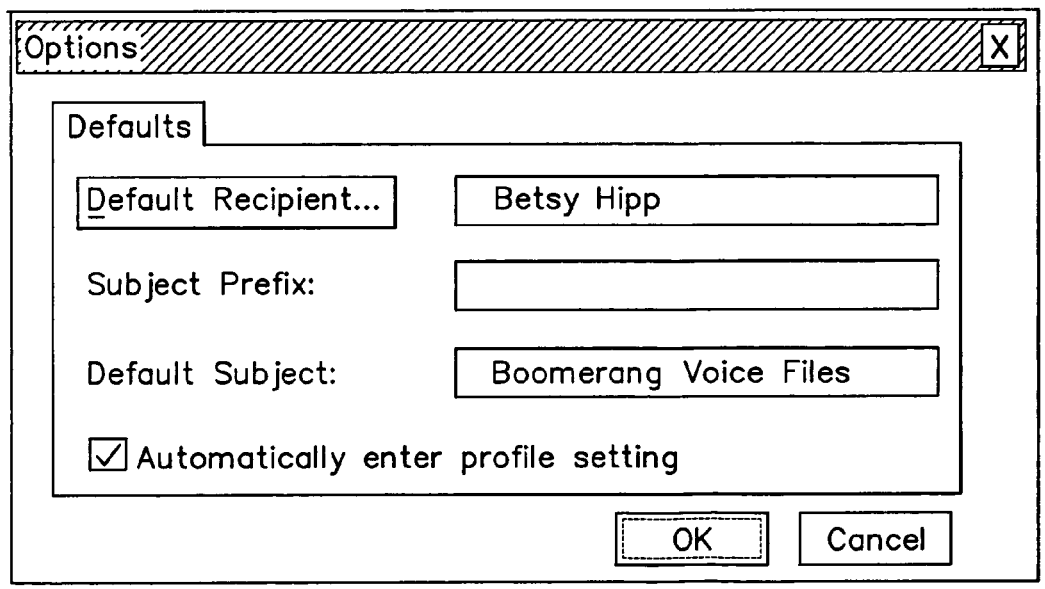

The "Options" selection from the "Tools" pull-down menu causes the PC to display the screen shown in FIG. 10. This screen allows the user to set the default settings for the message recipient (i.e., the transcriptionist), as well as text to be automatically inserted into the "Subject" field of the messaging screen of FIG. 5. Alternatively, a default subject prefix may be set for insertion into the "Subject" field.

The "Compose" and "Help" pull-down menus provide options commonly available in connection with text editing applications.

The toolbar shown at 66 in FIG. 5 permits shortcuts to certain functions available via the pull-down menus. For example, the functions accessible through the toolbar may include: send dictation file, cut, copy, paste, delivery receipt, read receipt, high priority, low priority, initiate recording, and delete dictation file.

Certain features of the voice record display of FIG. 6 will now be described. The display of FIG. 6 includes a set of pull-down menus represented by headings indicated at 100, a toolbar indicated at 102, a file position indicator bar 104 and a backspace control slidebar 106. The indicator bar 104 shows the current position in the dictation file during playback, record and editing operations. The position indicator within the bar may be dragged to change the position in the dictation file.

The backspace control slidebar 106 can be manipulated to set the time increment applied when the rewind function is actuated.

The toolbar 102 includes conventional audio file control button areas for actuating functions such as record, play, rewind, fast-forward, go to start, go to end, and stop. A help function and conventional file management options are also actuatable through the toolbar.

Figure 6:
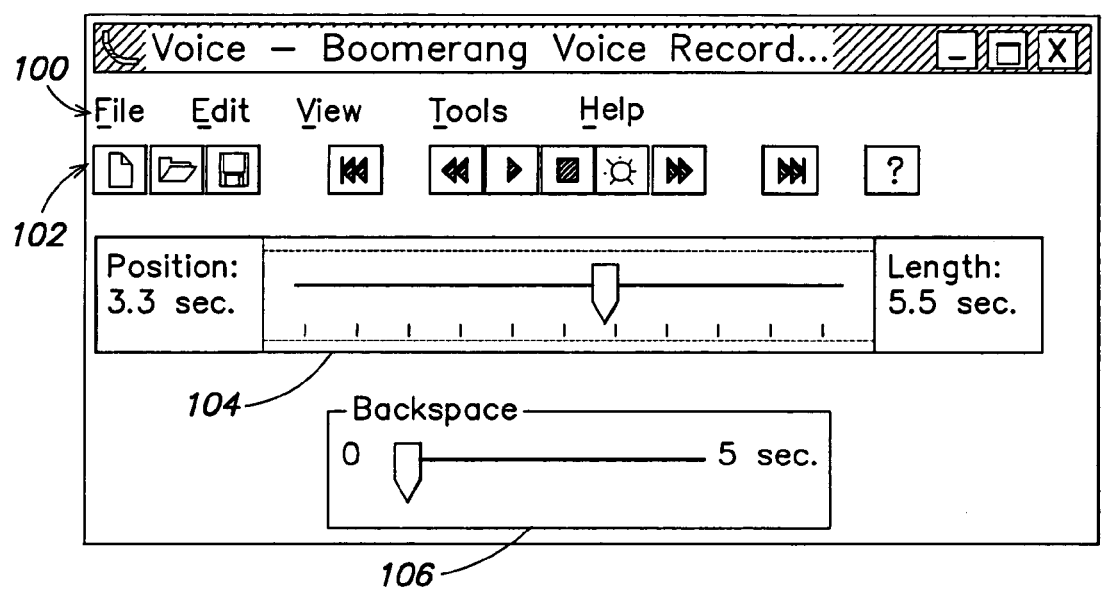
FIG. 6 is a screen display presented during creation of a dictation file.

The pull-down menus available at the voice record display of FIG. 6 are headed "File", "Edit", "View", "Tools", and "Help".

Figure 11:
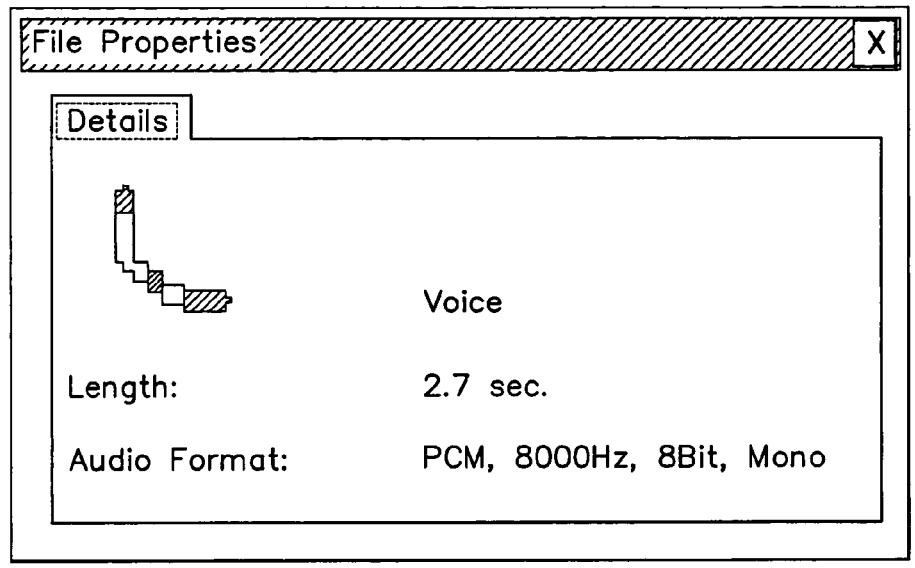

One of the options available under the "File" pull-down menu is a "File Properties" option which invokes the screen shown in FIG. 11. The screen of FIG. 11 provides information about the current dictation file.

Other options available under the "File" pull-down menu are conventional file management options as well as a "send" option.

Another option available under the "File" pull-down menu is "Exit". This option allows the user to return to the messaging window of FIG. 5. If a dictation file has been started, the PC will display a dialog box asking whether the dictation file should be saved or discarded. If the dictation file is to be saved, a dialog box is presented to permit entry of a desired file name and path. Alternatively, the dictation file can be sent to the transcriptionist.

The "Edit" pull-down menu provides options permitting the user to select between insert and overwrite modes, to delete all of the dictation file prior to the current position, or to delete all of the dictation file after the current position.

The "View" pull-down menu permits the author to choose whether or not to display portions of the screen of FIG. 6, including the audio controls portion of the toolbar 102, the file position indicator bar 104 and the backspace control slidebar 106. The author is also permitted to control whether the display of FIG. 6 is to "pop up" each time the record function is actuated from the hand microphone or from the messaging window of FIG. 5.

Figure 12:
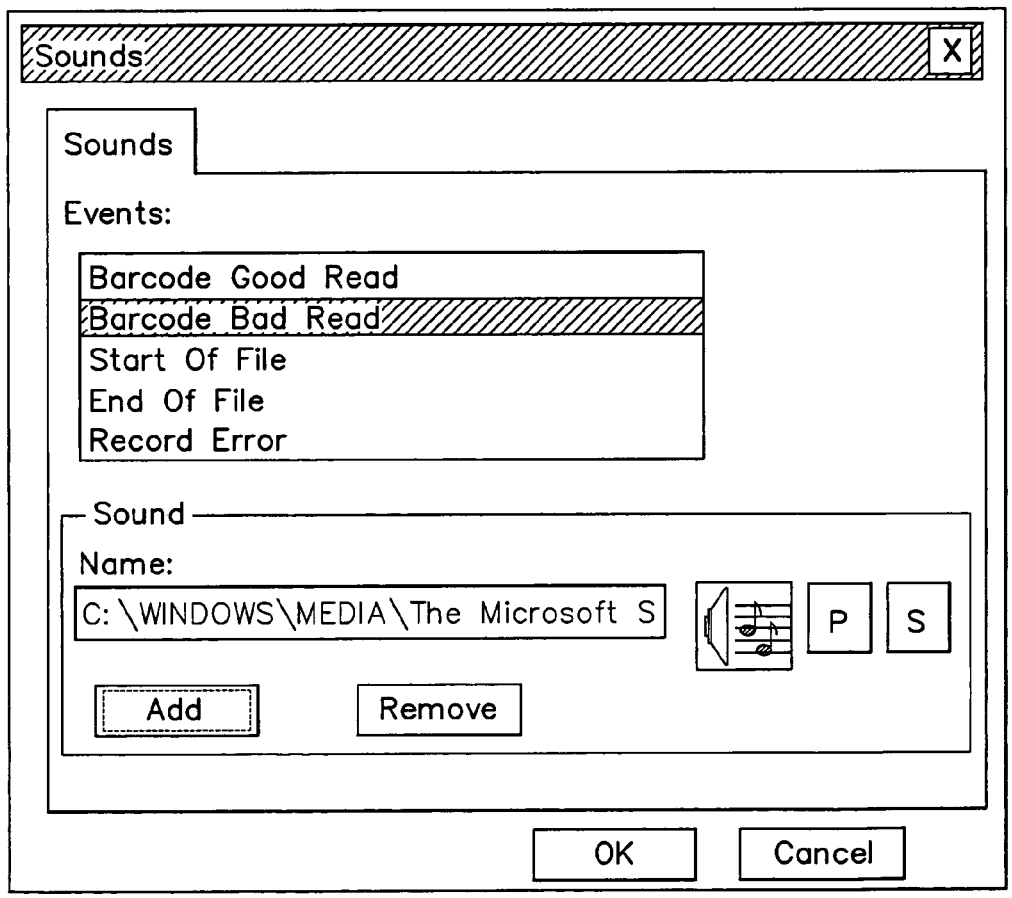

Continuing to refer to FIG. 6, the "Tools" pull-down menu permits the user to access the "Audio Properties" dialog boxes previously described with reference to FIGS. 7-9. In addition, a "Sounds" option in the "Tools" pull-down menu allows the user to access a screen display shown in FIG. 12. This is a dialog box which allows the user to assign sounds to be played upon the occurrence of certain events. In a preferred embodiment, the events which may be sound-enabled are: barcode read good, barcode read bad, start of file, end of file, recording error.

Referring again to FIG. 6, the remaining pull-down menu, entitled "Help", provides access to conventional on-line help functions, adapted to guide the user in utilizing the dictation application.

Figure 13:
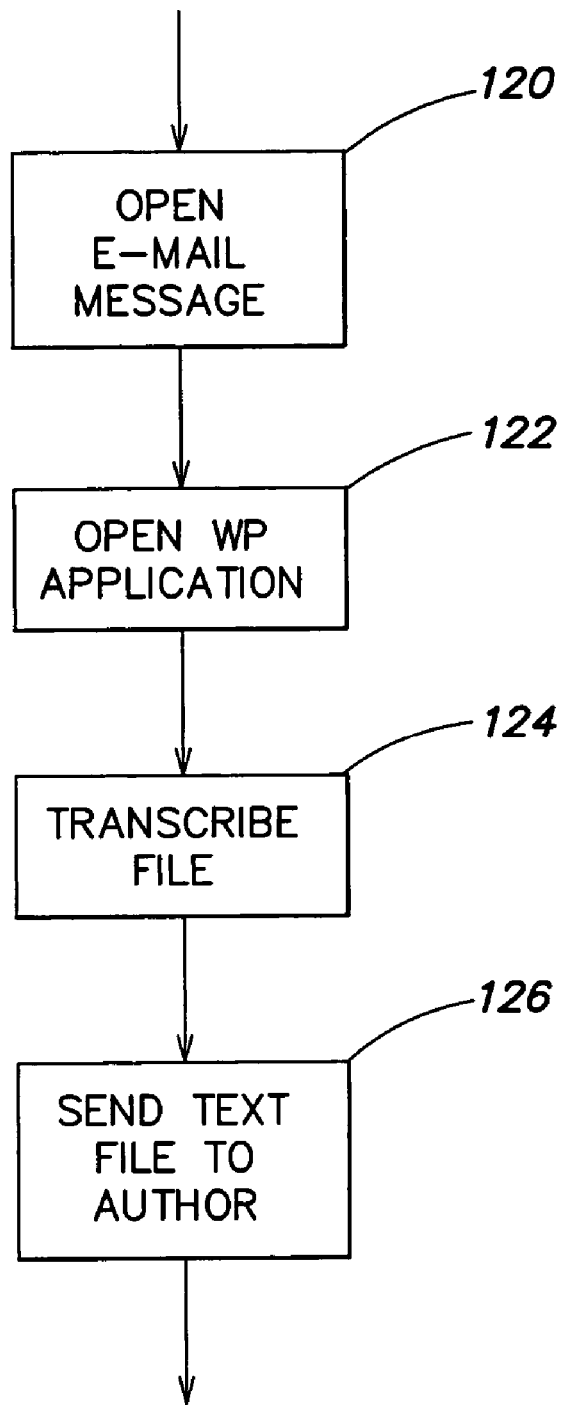
FIG. 13 is a flow chart which illustrates operation of a transcription station that is part of the system of FIG. 1.

FIG. 13 illustrates a process which is carried out by the PC at the transcriptionist's station after transmittal of the dictation file to the transcriptionist's station. In accordance with conventional operation of an electronic mail system, receipt of the author's e-mail message with appended voice file is announced at the transcriptionist's PC. Preferably, this is done by causing a distinctive icon to appear on the screen of the transcriptionist's PC. The transcriptionist then opens the e-mail message (step 120 in FIG. 13), and invokes the word processing application resident on the transcriptionist's PC (step 122). The transcriptionist proceeds to transcribe the dictation file (step 124) using the foot pedal 30 (FIG. 1) to control playback of the dictation file. When transcription of the dictation file is complete, the transcriptionist sends the resulting text file back to the author's workstation (step 126), by use of the electronic mail system. Alternatively, of course, the transcriptionist may print and distribute the text file in hard copy form.

Once the text file has been transmitted to the author's workstation, the text file may be displayed as alphanumeric characters at the author's workstation for the purpose of proofreading, editing, etc.

A given transcription station may be designated to be the preferred destination for dictation files generated at and transmitted from a plurality of author stations. The transcription station may implement the same kinds of job queuing functions present in conventional central dictation systems. Furthermore, a central dictation system itself may be designated as the e-mail addressee for the dictation files, in which case a dictation supervisor may manage the workload and assign dictation jobs in accordance to conventional practices employed in central dictation systems.

In addition to advantages previously described, the present invention is advantageous in that a dictation system co-extensive with an enterprise's existing network of PC's can be formed by loading suitable software and adding low-cost items of peripheral equipment. The e-mail-based dictation system described herein could also be usefully employed by a secretarial service to provide dial-in dictation services. For this application as well as others, it is highly advantageous that only a minimal additional investment in capital equipment is required if PC's and data networking are already in place.

Although the dictation system shown in FIG. 1 includes plural author workstations and transcriptionist workstations, it should be understood that the dictation system could have as few as one author workstation and one transcriptionist workstation. The transmission path 34 shown in FIG. 1 could be provided over the Internet.

Although the hand microphones shown herein are preferably connected to the respective PC's by wire signal connections, it is also contemplated to provide a wireless signal connection between the hand microphones and respective PC's.

Also, the foot pedals referred to herein are primarily intended for use at transcriptionists' stations, but could be adapted and programmed for use in controlling dictation operations so that "hands-free" dictation could be implemented. In this case, an author who was unable to use his or her arms could still operate the e-mail-based dictation system described herein.

It is to be understood that the above description may indicate to those skilled in the art additional ways in which the principles of this invention may be used without departing from the spirit of the invention. The particularly preferred methods and apparatus are thus intended in an illustrative and not limiting sense. The true spirit and scope of the invention are set forth in the following claims.

What is claimed is:

1. A method of operating a dictation system comprising a personal computer and personal computer display, said method comprising the steps of:
    programming a plurality of hand microphone mounted user-programmable control switches by selecting a dictation function option from a plurality of menus appearing on said personal computer display;
    displaying information indicative of the currently programmed functions of said switches on a hand microphone display located in the vicinity of said switches;
    actuating at least one of said hand microphone mounted user-programmable control switches to effectuate said dictation function selected.

2. A method, in accordance with claim 1, wherein the at least one of said hand microphone mounted user-programmable control switches activates storage of a voice signal appended to an e-mail message file.

3. A dictation system, implemented on a personal computer comprising:
    a system bus;
    at least one processor connected to said system bus;
    a display connected to said system bus that presents a plurality of dictation function control option menus under the control of said at least one processor;
    a recording medium connected to said system bus configured to store data files and software executable on said at least one processor,
    a hand microphone directly connected to said system bus operatively configured to input a voice signal into said recording medium; said hand microphone including a plurality of hand microphone mounted user-programmable control switches, operatively configured to be programmable to different dictation functions by selecting a dictation function control option from said display menus;
    a display incorporated into said hand microphone displaying information indicative of the currently programmed functions of said switches.

4. A dictation system, in accordance with claim 3, further including a network interface component that electronically connects to an external communications network.

5. A computer-usable medium having computer readable instructions stored thereon for execution by a processor to perform a method comprising:
    programming a plurality of hand microphone mounted user-programmable control switches by selecting a dictation function option from a plurality of menus appearing on said personal computer display;
    displaying information indicative of the currently programmed functions of said switches on a display located on the hand microphone in the vicinity of said switches;
    actuating at least one of said hand microphone mounted user-programmable control switches to effectuate said dictation function selected.

* * * * *